United States Patent [19]

Scandella et al.

[11] 4,238,083
[45] Dec. 9, 1980

[54] WINDING DRUM FOR A FLEXIBLE TAPE

[75] Inventors: Louis Scandella, Marnay; Bernard Faivre, Besancon, both of France

[73] Assignee: Stanley-Mabo S.A., Besancon, France

[21] Appl. No.: 27,525

[22] Filed: Apr. 5, 1979

[30] Foreign Application Priority Data

Apr. 12, 1978 [FR] France .................... 78 11435

[51] Int. Cl.³ .................................. B65H 75/28
[52] U.S. Cl. ........................................ 242/74
[58] Field of Search ............... 242/74, 74.1, 74.2, 242/84.8; 33/138

[56] References Cited

U.S. PATENT DOCUMENTS

| 3,246,729 | 4/1966 | Bishob | 242/74 X |
| 3,304,021 | 2/1967 | Quenot | 242/74.1 |

FOREIGN PATENT DOCUMENTS

| 673012 | 2/1939 | Fed. Rep. of Germany | 242/74 |
| 113895 | 3/1918 | United Kingdom | 242/74 |

Primary Examiner—John M. Jillions
Attorney, Agent, or Firm—Prutzman, Kalb, Chilton & Alix

[57] ABSTRACT

A winding drum for a flexible tape comprises two side faces and peripheral wall defining spaced first and second grooves. The first groove has a longitudinal axis parallel to the axis of rotation of the drum and has an opening at one end thereof that is defined by one of the side faces and is closed at the other end thereof. First and second pins are located respectively in the first and second grooves whereby an end of a flexible tape may be bent to form a loop and passed around the first pin in the first groove and the tape then passed over the peripheral wall of the drum and the free end of the tape and passed around the second pin in the second groove before being wound around the drum.

4 Claims, 2 Drawing Figures

WINDING DRUM FOR A FLEXIBLE TAPE

The invention relates to a winding drum for a flexible tape and in particular to a drum incorporating a means of securing a measuring-tape to the drum.

Various devices have been proposed for securing the inner end of a flexible measuring-tape, for example a ten-meter measuring-tape, to a winding drum.

For example, a device is known in which the hub of the drum is provided with an axial slot which connects with a radial slot in one side of the drum in order to allow the positioning and removal of the end of the tape, which is anchored by a retaining lug housed in said hub.

According to another known device, the winding drum has a double wall, the outer wall being interrupted at a certain angle. The measuring-tape terminates in a loop which is fixed to the inner wall, the tape passing out through the opening in the outer wall.

According to another known device, the end of the tape is folded over to form a loop and a peg is introduced into this loop, which peg is inserted between two jaws formed on the periphery of the drum. These jaws are defined by the edges of a cylindrical recess opening out into a slot in the peripheral wall of the drum.

These known devices all require that the end of the tape be prepared specially before being fixed to the winding drum. In the first example mentioned, the end must be provided with an iron or plastic lug, in the second and third examples considered, the end of the tape must be folded over to form a loop and secured in this position in order that the loop does not become undone.

The present invention proposes a very simple winding drum with means which ensures effective securing of the bare end of the tape without this end having to be previously prepared as aforesaid.

According to the present invention there is provided a winding drum for a flexible tape comprising two side faces; a peripheral wall defining spaced first and second grooves, which first groove has a longitudinal axis parallel to the axis of rotation of the drum and has an opening at one end thereof that is defined by one of the side faces and is closed at the other end thereof; and first and second pins located respectively in the first and second grooves whereby an end of a flexible tape may be bent to form a loop and passed around the first pin in the first groove and the tape thence passed over the peripheral wall of the drum and the free end of the tape and passed around the second pin in the second groove before being wound around the drum.

An attachment of the measuring-tape to the winding drum is thus achieved which, whilst facilitating fitting of the tape, has the advantage that no local excess thickness occurs outside the drum at the point where the tape is secured. This advantage enables the tape to follow the periphery of the winding drum perfectly.

The invention will now be described, by way of example, with reference to the accompanying drawing in which.

Figure 1:
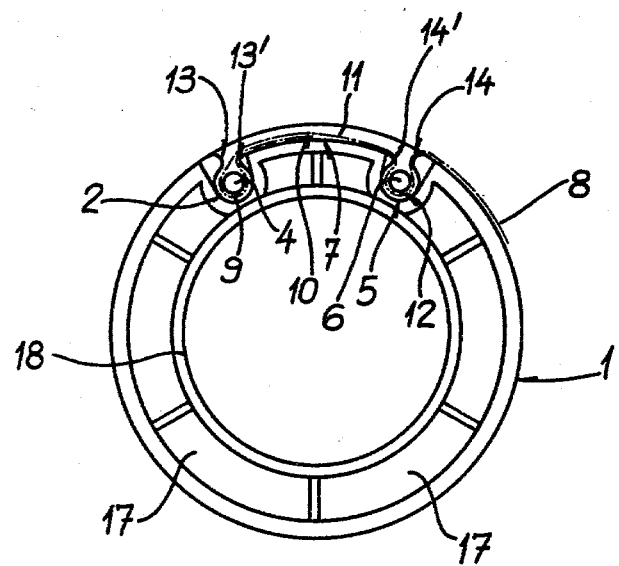
FIG. 1 is an elevational view of a winding drum provided with a securing device according to the invention, with part of the end of a secured tape.
Figure 2:
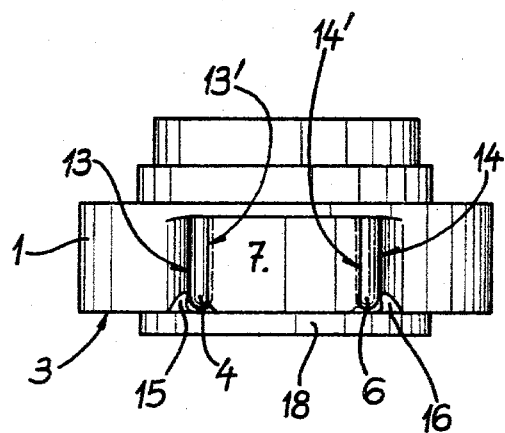
FIG. 2 is a view of the contour of the drum without the tape.

The peripheral wall 1 of the winding drum is provided with a first cylindrical groove 2 located parallel to the axis of rotation of said drum and opening at one end into one of the side faces 3 of the drum. The other end of the groove 2 is closed by the peripheral wall, which defines an opening in the form of a slot into the groove 2 which slot has a width less than that of the groove 2 such that edges 13, 13' of the groove constitute a jaws. Located in the groove 2, concentrically with respect to the latter, is a pin 4 fixed by one of its ends in the closed end or base of the groove 2. The gap between the wall of the groove 2 and the pin 4 is slightly greater than the depth of a measuring-tape. A second identical groove 5 is formed at a distance from this first groove 2, in the winding direction of the tape, which second groove 5 is also provided with a central pin 6. The portion 7 of the peripheral wall 1 of the drum located between these two grooves is recessed with regard to the rest of the wall for a reason which will be explained subsequently.

The end portion 11 of a flexible linear measuring tape 8 is bent over once in the form of a loop 9 and is threaded laterally into the first groove 2 about the first pin 4. The free end 10 of the tape which projects from said groove 2 is pressed by the rest of the end portion 11 of the tape against the recessed portion 7 of the periphery of the drum, then the end portion 11 of the tape is bent over a second time in the form of an open loop 12 and engaged in the second groove 5 around the second pin 6, before being wound on the drum 1.

The flexible tape 8, preferably made from plastics material or plasticised fibres is thus retained effectively on its winding drum. Owing to this double fastening produced in this way, the tape 8 changes direction four times and bears frictionally against the two pins 4 and 6 and the edges of the grooves 2 and 5 so that the tape is virtually locked in these grooves without it being necessary to provide a loop closed by rivetting or sticking at the end of the tape, as in the former known devices.

In the region of the fastening, the free end 10 of the tape does not form any excess thickness around the periphery of the drum owing to the recessed part 7 of the peripheral wall 1.

So as not to damage the tape, the edges 13, 13', 14, 14' of the grooves 2, 5 opening onto the periphery of the drum have rounded edges.

Moreover, in order to facilitate positioning of the tape laterally in the two grooves, 2, 5, the rim of the latter opening onto the side face 3 of the drum is provided with chamfers 15, 16.

The winding drum with the grooves and pins is preferably manufactured from moulded plastics material, in one-piece with hollow parts 17 for reducing the weight and a central hub 18.

As a variation, the two pins 4, 6 could be constituted by separate pegs which could be introduced and secured between the jaws formed by the edges of the grooves.

What is claimed is:

1. In a tape measure having a rotary winding drum and an elongated flexible tape wound upon the drum, the improvement wherein the winding drum has two side faces and a generally cylindrical peripheral wall therebetween, first and second closely angularly spaced axially extending peripheral grooves opening through one of the side faces and having axes parallel to the axis of the drum and radially extending peripheral slot openings, first and second axially extending fixed cylindrical pins generally centrally located in the first and second grooves respectively, the peripheral wall having a recess portion extending the full circumferential distance between the peripheral grooves, the first and second grooves respectively being generally cylindrical and each of the slots having a width less than the diameter of the associated pin and the drum wall having rounded generally circumferentially projecting portions at both circumferential edges of each slot and the flexible tape having a free end positioned in the recess and looped around the first pin in the first groove, and then passed over the portion of the tape in the recess and underneath the second pin in the second groove before being wound to form a convolution around the drum.

2. The device as claimed in claim 1, in which the second groove is identical to the first groove.

3. The device as claimed in claim 1, in which the opening of the first groove defined by said one side face of the drum has chamfered edges.

4. The device as claimed in claim 1, in which the first and second pins are formed integrally with the drum and are arranged concentrically in said first and second grooves.

* * * * *